(12) United States Patent
Rubbert

(10) Patent No.: US 6,311,666 B1
(45) Date of Patent: Nov. 6, 2001

(54) METHOD AND APPARATUS FOR EXHAUST TEMPERATURE ELEVATION

(75) Inventor: Stephan Rubbert, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/519,901

(22) Filed: Mar. 6, 2000

(30) Foreign Application Priority Data

Mar. 5, 1999 (DE) .............................. 199 09 796

(51) Int. Cl.[7] .................................. F92B 17/00
(52) U.S. Cl. .............................. 123/295; 60/285
(58) Field of Search ................ 123/295; 60/285

(56) References Cited

U.S. PATENT DOCUMENTS

| 6,062,191 | * | 5/2000 | Ooba | 123/295 |
| 6,151,890 | * | 11/2000 | Hoshi | 60/285 |
| 6,189,316 | * | 2/2001 | Surnilla et al. | 60/285 |
| 6,240,894 | * | 6/2001 | Enoki et al. | 123/295 |

FOREIGN PATENT DOCUMENTS

| 0 838 584 A2 | 4/1998 | (EP) . |
| 10-054287 | 2/1998 | (JP) . |

\* cited by examiner

*Primary Examiner*—John Kwon
(74) *Attorney, Agent, or Firm*—Crowell & Moring LLP

(57) ABSTRACT

In a method and apparatus for exhaust temperature elevation for an internal combustion engine with a catalytic converter in which the fuel is direct-injected, the supply of fresh air can be regulated by a throttle device, and the exhaust temperature is determined by a temperature probe or a temperature model, with the internal combustion engine initially operating in stratified mode. The exhaust temperature can be elevated by throttling of the internal combustion engine when an exhaust temperature falls below a threshold value.

17 Claims, 2 Drawing Sheets

METHOD AND APPARATUS FOR EXHAUST TEMPERATURE ELEVATION

This application claims the priority of German patent document 199 09 796.8, filed Mar. 5, 1999, the disclosure of which is expressly incorporated by reference herein.

BACKGROUND AND SUMMARY OF THE INVENTION

The present invention relates to a method and apparatus for raising the exhaust temperature in an internal combustion engine with a catalytic converter, and particularly to an internal combustion engine which is operated with stratified direct injection.

With stratified direct injection, non-throttled operation at low partial load or at idle causes the exhaust temperature to drop to values below 200° C. When a catalytic converter is used in the exhaust line, this temperature drop cools the catalyst during prolonged operation, so that the catalyst becomes ineffective.

To increase the temperature, Japanese patent document 10054287 A proposes to adjust the ignition timing. However, the exhaust temperature in an internal combustion engine with stratified operation can be increased to only a limited extent by retarding the timing, since a longer interval between the end of injection and the ignition leads to misfires and unstable combustion.

General throttling, on the other hand, degrades efficiency because of rising charge change losses and a low degree of combustion efficiency.

One object of the invention, therefore, is to provide a method and apparatus for raising the exhaust temperature as needed, with the good efficiency of non-throttled stratified operation being used, even in short-term idle or in low partial-load operation.

This and other objects and advantages are achieved by the method and apparatus according to the invention, in which the exhaust gas temperature is monitored by means of a temperature probe or by means of an exhaust gas temperature model, and when the monitored temperature falls below a threshold value, the internal combustion engine is throttled to raise the exhaust gas temperature.

Accordingly, the exhaust temperature can be raised by throttling only if an exhaust temperature threshold is undershot.

Preferably, throttling can be time- and/or temperature-controlled so that the degree of throttling can be adapted to individual operating conditions.

According to a preferred embodiment of the invention, the catalytic converter can use precatalysts followed by temperature probes as devices to determine the exhaust temperature for example. Precatalysts in turn can be followed by a storage catalyst ($NO_x$ storage catalyst for example) which is checked during its regeneration phase by a monitor probe. The check can be performed by evaluating the lambda jump.

In order to detect the efficacy of the catalysts in general, ODB sensors can be used in engine control (for example a lambda probe, a $NO_x$ sensor, or an exhaust temperature sensor).

According to one preferred embodiment, a check is made during stratified operation of the internal combustion engine to determine whether throttling is sufficient to raise the temperature. If not, a switch is made in a second stage to homogeneous operation of the internal combustion engine.

In addition, the pre-ignition angle can be reduced to raise the temperature in the exhaust line. In order to react to factors which have an influence on the catalyst temperature, the exhaust temperature threshold value can be adapted as a function of the vehicle operating conditions or the vehicle ambient conditions. In particular, an adjustment can be made as a function of the ambient temperature and vehicle speed. By this measure, for example with the vehicle rolling (e.g. downhill), rapid cooling of the storage catalyst is prevented by early measures to raise the temperature. In addition, the temperature gradient could also be evaluated. When there is a sharp temperature drop in the catalyst, the engine can be switched directly to homogeneous operation.

All in all, the present method and apparatus according to the invention result in an appropriate temperature increase by which cooling of the catalyst is prevented, and good efficiency of an engine operated in non-throttled stratified operation is maintained.

Other objects, advantages and novel features of the present invention will become apparent from the following detailed description of the invention when considered in conjunction with the accompanying drawings.

DETAILED DESCRIPTION OF THE DRAWINGS

Figure 1:
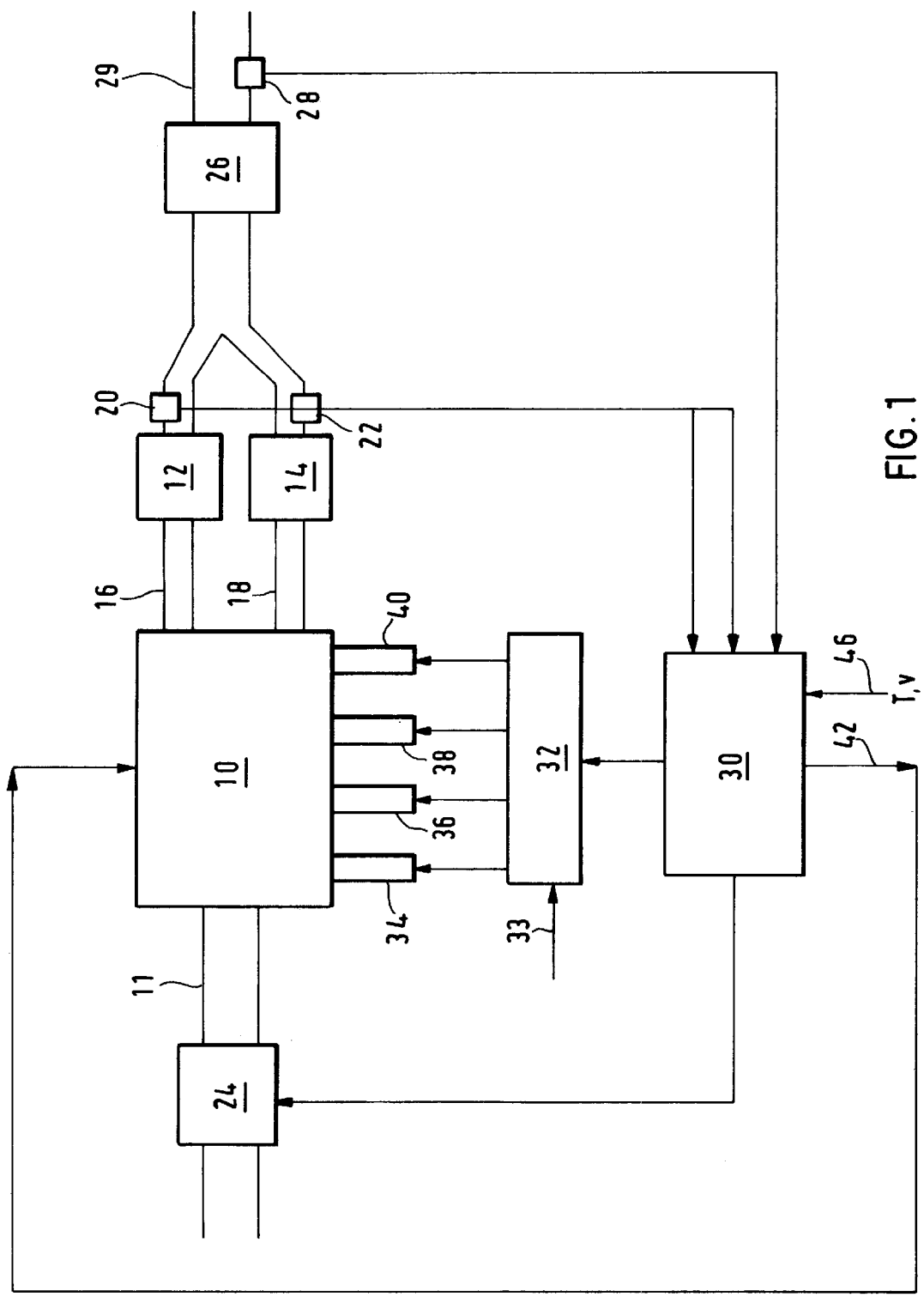
FIG. 1 is a schematic block diagram of an apparatus for raising exhaust gas temperature according to the invention.

FIG. 1 shows schematically an internal combustion engine 10 with an intake manifold 11 and two exhaust lines 16, 18 that terminate in a common exhaust manifold 29. Precatalysts 12 and 14 are located in the two exhaust branches 16 and 18. An exhaust temperature sensor 20, 22 is provided downstream of each precatalyst 12, 14 and delivers its signal to a control unit 30.

After the two branches 16 and 18 come together, an $NO_x$ storage catalyst 26 is located in exhaust manifold 29 followed in turn by a monitor probe 28. The monitor probe can check the storage catalyst during its regeneration phase and also delivers its signal to control unit 30. The check is performed by evaluating the lambda jump of monitor probe 28.

A throttle device 24 with an adjustable throttle flap is located in intake manifold 11, and is influenced by control device 30. Of course throttle device 24 can also be affected by an additional control device, which is however not shown.

Control device 30 is connected with an injection control 32 which receives and contains information (arrow 33) from other control units. According to the injection processes described by injection control 32, information is delivered to injection nozzles 34 to 40 which accordingly deliver fuel from a fuel line (not shown) to the combustion chambers.

In addition, a connection 42 is provided between control device 30 and engine 10 through which additional information, for example relative to valve spread or ignition timing adjustment, is chosen and delivered directly to the engine.

Figure 2:
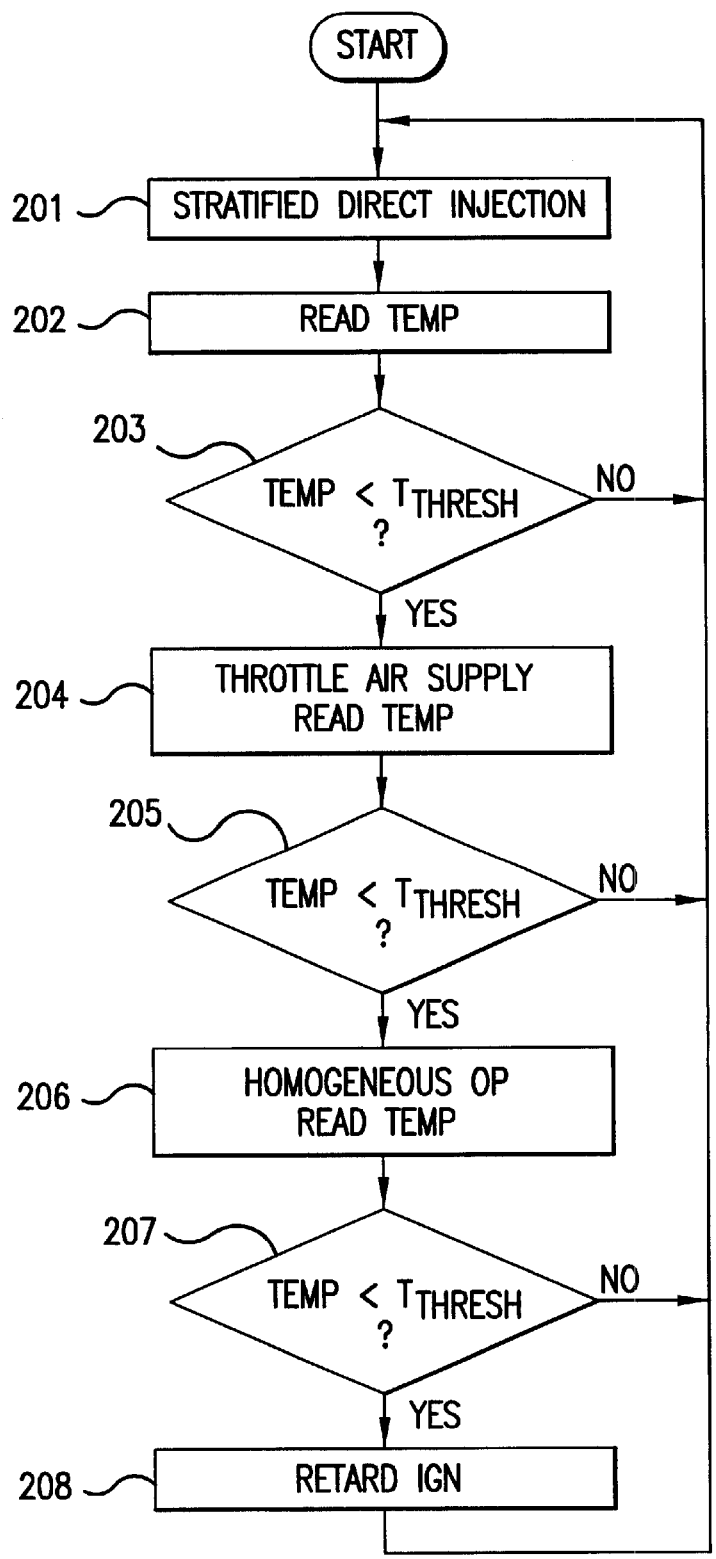
FIG. 2 is a flow chart which shows the process according to the invention.

As shown in FIG. 2, according to the present invention, during normal operation (step 201) the internal combustion engine is operated with stratified direct injection, because unthrottled stratified operation produces good efficiency and hence low fuel consumption. However, with such stratified injection, during idle operation or low partial load operation, exhaust temperatures below 200° C. can occur. As a result, the catalyst cools off, drops below its conversion temperature, and thus becomes ineffective.

To avoid this problem, the exhaust temperature must be kept above a specified temperature threshold value, which is determined by control unit 30 by checking the signals delivered by exhaust temperature sensors 20 and 22 (step 202). If the exhaust temperature then falls below a specified threshold (step 203), the control unit 30 delivers a signal to throttle device 24. This signal is time- and temperature-controlled and causes throttling of the air supply in throttle device 24 (step 204), resulting in an increase in exhaust temperature. As already noted, the degree of throttling can be chosen as a function of temperature.

Furthermore, vehicle operating and ambient parameters can be taken into account in determining the exhaust temperature threshold. For example, the exhaust temperature threshold can be selected as a function of the ambient temperature and the vehicle speed. At low ambient temperature and with the vehicle in motion, rapid cooling of the catalytic converter can be prevented, for example, by an early increase in the temperature threshold. The temperature gradient can also be evaluated During throttled stratified operation of the internal combustion engine, the signals from the exhaust temperature sensors 20 and 22 are monitored using control unit 30, and a determination is made as to whether throttling in stratified operation leads to a sufficient increase in the exhaust temperature (step 205). If not, a switch is made to homogeneous operation of the internal combustion engine with stoichiometric combustion (step 206). Accordingly, injection control 32 is operated like the other motor elements, such as the intake and exhaust valve control.

If this measure is still insufficient, as indicated by a continuous checking of the signals from exhaust temperature sensors 20 and 22 (step 207), the ignition will be retarded and the pre-ignition angle will be reduced (step 208). For this purpose, control device 30 delivers the corresponding signal or signals to engine 10 or its engine controls.

By the method and apparatus according to the invention, when an exhaust temperature threshold is undershot at the temperature probes downstream of the precatalysts, the exhaust temperature level is raised by throttling. Thus, the unthrottled stratified operation can be utilized during short-term idle or in the low partial load range, resulting in fuel economies. It is only during a longer idle phase or a longer phase of low partial load operation, in other words when the catalyst temperature drops below 200° C. for example, that throttling takes place. However, this is either time-controlled or is performed only until the exhaust temperature threshold is exceeded once again.

A switch to homogeneous operation with stoichiometric combustion and lambda regulation is considered only if throttling is insufficient. In this case, the two precatalysts operate as conventional three-way catalysts that convert all pollutant components. The efficacy of the $NO_x$ storage catalyst used in the present case is therefore not required in this operating state. The monitoring of the storage catalyst in this operating state could be eliminated. Finally, for a further exhaust temperature increase, the pre-ignition angle can be reduced if necessary in a third step.

In the final analysis, an exhaust temperature regulation is achieved which is optimized from the standpoint of efficiency and emissions.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for increasing exhaust temperature in an internal combustion engine having a catalytic converter, fuel injectors for injecting fuel, a throttle device for regulating the fresh air supplied to the engine, and one of a temperature probe and a temperature model for determining the exhaust temperature, wherein:

the internal combustion engine is operated initially in a stratified mode; and when an exhaust temperature threshold value is undershot, the internal combustion engine is throttled to raise the exhaust temperature.

2. The method according to claim 1, wherein throttling takes place under at least one of temperature and time control.

3. The method according claim 1, wherein a storage catalyst connected downstream of a precatalyst is monitored by a monitoring probe during a regeneration phase of said catalyst.

4. The method according to claim 1, further comprising:

checking to determine whether throttling is sufficient to raise the temperature; and, if not, switching to homogeneous operation of the internal combustion engine.

5. The method according to claim 4, further comprising reducing the ignition angle.

6. The method according to claim 1, wherein the exhaust temperature threshold value is selected as a function of at least one of vehicle operating conditions and vehicle ambient conditions.

7. The method according to claim 1, wherein the exhaust temperature threshold is determined as a function of the ambient temperature.

8. A device for increasing exhaust temperature in an internal combustion engine having a catalyst converter, direct fuel injection, and a throttle that influences the air supplied, said device comprising:

one of a temperature probe and a temperature model for determining the exhaust temperature; and a control unit connected with the throttle and the probe or model for determining the exhaust temperature;

wherein said control device causes said internal combustion to operate with stratified direct fuel injection during normal running, and causes throttling of the internal combustion engine to raise the temperature when an exhaust temperature threshold is undershot.

9. Device according to claim 8, wherein the control device causes throttling of the internal combustion engine as a function of at least one of time and temperature.

10. Device according to claim 8, wherein precatalysts are provided in the exhaust line, followed by exhaust temperature sensors.

11. Device according to claim 8, wherein the precatalysts are followed by a storage catalyst monitored by a following monitor probe.

12. Device according to claim 8, wherein the control device has a unit which switches to homogeneous operation of the internal combustion engine when throttling is insufficient to raise the exhaust temperature.

13. Device according to claim 8, wherein the control device generates a signal to reduce the pre-control angle.

14. Device according to claim 8, wherein the control device is designed to receive and evaluate additional vehicle operating parameters or vehicle ambient data.

15. Device according to claim 14, wherein the control device has an input for a signal that corresponds to at least one of ambient temperature and vehicle speed, and determines the exhaust temperature threshold value as a function of these signals.

16. A method for controlling operation of an internal combustion engine having a catalytic converter, fuel injectors for injecting fuel directly into the engine, an intake air throttle, and a temperature sensor disposed in an exhaust gas flow of said engine, said method comprising:

operating said engine with stratified direct injection of fuel, without throttling of an intake air flow;

detecting temperature of said exhaust gas flow;

comparing detected temperature of said exhaust gas flow with a threshold temperature value;

throttling said intake air flow to raise the exhaust gas temperature only when said detected temperature falls below said threshold value.

17. Apparatus for controlling an exhaust gas temperature of an internal combustion engine having a catalytic converter, fuel injectors for injecting fuel into the engine, and an intake air throttle; said apparatus comprising:

a control unit for controlling said throttle and said fuel injectors; and a temperature determination arrangement for determining an exhaust temperature of an exhaust gas flow of said engine and providing a signal indicative thereof to said control unit;

wherein said control unit causes said engine to operate with stratified direct fuel injection without throttling of the intake air flow when said exhaust temperature is above a first threshold value, and causes throttling of said intake air flow when said exhaust temperature falls below said threshold value.

* * * * *